United States Patent
Yu

(10) Patent No.: US 7,181,627 B2
(45) Date of Patent: Feb. 20, 2007

(54) BIOMETRIC SYSTEM FOR REPLACING PASSWORD OR PIN TERMINALS

(75) Inventor: Ki S. Yu, Mesa, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 824 days.

(21) Appl. No.: 10/210,441

(22) Filed: Aug. 1, 2002

(65) Prior Publication Data
US 2004/0025029 A1   Feb. 5, 2004

(51) Int. Cl.
H04L 29/12 (2006.01)
H04L 29/02 (2006.01)
H04L 12/28 (2006.01)

(52) U.S. Cl. ............... 713/186; 726/3; 726/21
(58) Field of Classification Search ............ None
See application file for complete search history.

(56) References Cited

U.S. PATENT DOCUMENTS 3,959,884 A * 6/1976 Jordan et al. ............. 283/69
2002/0174347 A1 * 11/2002 Ting ............................ 713/186

FOREIGN PATENT DOCUMENTS

WO   WO 9926188 A1 *   5/1999

* cited by examiner

*Primary Examiner*—Gilberto Barron
*Assistant Examiner*—Venkat Perungavoor

(57) ABSTRACT

Systems and methods are described for a biometric system for replacing password or PIN terminals. A method includes providing a computer network with a terminal; providing the terminal with a fingerprint reader; utilizing a standard pattern to determine a characteristic of the fingerprint reader; and utilizing the characteristic of the fingerprint reader to transform a user fingerprint.

13 Claims, 2 Drawing Sheets

BIOMETRIC SYSTEM FOR REPLACING PASSWORD OR PIN TERMINALS

BACKGROUND OF THE INVENTION

1. Field of the Invention

The invention relates generally to the field of biometrics. More particularly, the invention relates to biometric systems that can be used to replace password or personal identification terminals.

2. Discussion of the Related Art

In today's electronic society, an ordinary person must carry several forms of identification. The use of passwords and personal identification numbers (PINs) associated with these forms of identification have increased dramatically over the past several years. Traditionally, passwords and PINs have been utilized to provide a person with access to private information such as, for example, a bank account. A bank account can often be accessed via an automated teller machine (ATM). Most computer systems with multiple terminals also require the use of passwords or PINs to grant a user access to sensitive information.

Meanwhile, criminal activity, especially with regard to credit cards and ATM cards, has been increasing. Any individual in possession of another's password or PIN may be able to fraudulently use it, making the security of systems which rely on these forms of identification inherently fragile.

Biometrics is the study of physical attributes for verification of identity. A biometric identifying characteristic may be, for example, a fingerprint, a retina pattern, a voice pattern, or the like. Personal identification through fingerprint analysis is a technology which has been used extensively in law enforcement. A system for recognizing fingerprints may require a user to press a finger onto a glass or an optical lens. An image sensor under the optical lens such as a charge-coupled device (CCD) array captures the fingerprint image. A custom computer system and software can analyze the digitized image and convert it to a mathematical characterization, which can then be compared against data stored in a fingerprint database.

It would be desirable to utilize biometric systems in conjunction with computer systems of multiple terminals such as automated teller machine networks. Nevertheless, the use of fingerprint identification in such systems has encountered various difficulties. For example, each fingerprint reader has optical characteristics that seldom matches that of others. Consequently, each individual must be registered at each terminal in order to gain access to it.

Up to now, the requirements for utilizing a fingerprint authorization system in conjunction with computer systems with multiple terminals has not been met.

SUMMARY OF THE INVENTION

There is a need for the following embodiments. Of course, the invention is not limited to these embodiments.

According to an aspect of the invention, a method comprises: providing a computer network with a terminal; providing the terminal with a fingerprint reader; utilizing a standard pattern to determine a characteristic of the fingerprint reader; and utilizing the characteristic of the fingerprint reader to transform a user fingerprint.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
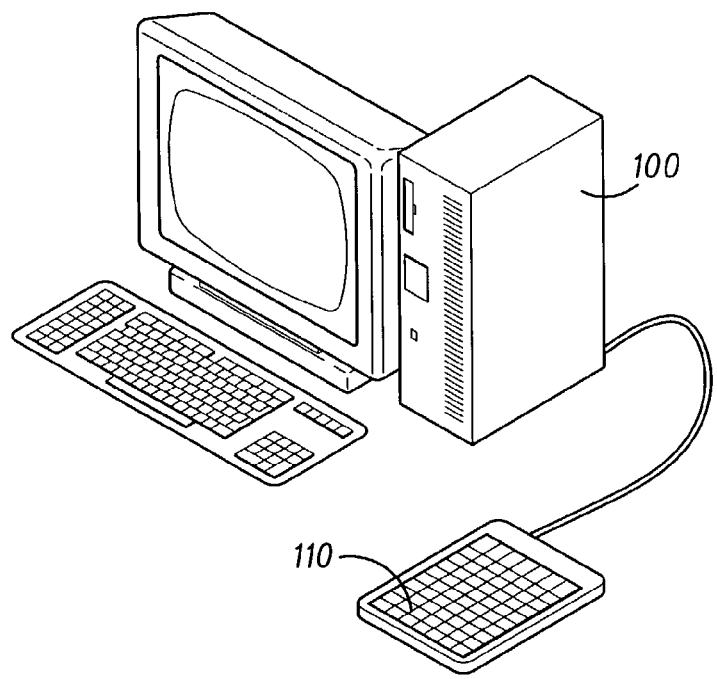
FIG. 1 is a block diagram of a biometric computer system.

Descriptions of well known starting materials, processing techniques, components and equipment are omitted so as not to unnecessarily obscure the invention in detail. It should be understood, however, that the detailed description and the specific examples, while indicating specific embodiments of the invention, are given by way of illustration only and not by way of limitation. Various substitutions, modifications, additions and/or rearrangements within the spirit and/or scope of the underlying inventive concept will become apparent to those of ordinary skill in the art from this disclosure.

In general, the context of the invention can include computer networks. The context of the invention can include biometric systems. The context of the invention can include biometric systems for replacing password or PIN terminals of computer networks and/or systems.

The invention can provide a method and/or apparatus for utilizing a biometric system in conjunction with computer system with multiple terminals such as automated teller machine networks. Up to now, the use of fingerprint identification in such systems has encountered various difficulties. For example, each fingerprint reader usually has its own optical and scanning characteristics. Such characteristics often do not match the characteristics of other readers in other terminals. These systems require each individual to be registered at each terminal in order to gain access to it.

A practical application of the invention that has value within the technological arts is a biometric system for replacing password/PIN terminals. Further, the invention is useful in conjunction with fingerprint readers, or in conjunction with ATM or computer networks, or the like. There are virtually innumerable other uses for the invention, as will be understood by those of ordinary skill in the art.

A biometric system for replacing password/PIN terminals, representing an embodiment of the invention, can be cost effective and advantageous for at least the following reasons. The invention allows users to access private information via a computer network without passwords and/or PINs. The invention provides a method and/or apparatus of calibrating different fingerprint readers, allowing an individual to utilize any computer terminal or ATM in a network without being registered at the particular computer terminal or ATM. The invention provides a method for creating a database of transformation coefficients characteristic of each fingerprint reader in a network, allowing compatibility of readings between different fingerprint readers. The invention improves quality and/or reduces costs compared to previous approaches.

The invention can include a biometric sensor calibration system which allows fingerprint sensors of different optical and/or scanning characteristics to be utilized in conjunction with a central fingerprint database for authorizing access to network terminals. The invention can include a method and/or apparatus for providing identity verification via a fingerprint reader at a computer terminal.

Several different types of fingerprint sensing devices are currently available. Some are simple optical devices (such as commonly used scanners) adapted to sense an image of a fingerprint and digitize it. Other sensing devices employ capacitive sensors and piezoelectric sensors. Fingerprint sensing devices are generally referred to as digital fingerprint readers (DFR).

Typically, a system for recognizing fingerprints requires a user to press a finger onto a glass or an optical lens. An image sensor under the optical lens such as a charge-coupled device (CCD) array or a complementary metal oxide semiconductor (CMOS) sensor captures the fingerprint image. The image obtained is digitized and further processed.

Current digital fingerprint readers (DFRs) cannot be used with banking/ATM networks because each DFR device has its own characteristics that do not match the characteristics of other DFRs. That is, the same fingerprint can yield different readings from device to device. This can be caused, for example, by differences in the optical lenses of each DFR.

Referring to FIG. 1, a block diagram of a prior art biometric computer system is depicted. A computer 100 is coupled to a digital fingerprint reader 110 (DFR). The DFR 100 can be used to read a user's fingerprint, digitize it, and process it. The computer 100 may also be responsible processing the digitized fingerprint. The digitized fingerprint is compared to a fingerprint database (previously stored in the computer 100) according to a comparison algorithm. Such algorithms are familiar to one of ordinary skill in the art.

Still referring to FIG. 1, upon comparison between the digitized fingerprint and the fingerprints in the database, a decision can be made regarding granting or denying access to some information. If the digitized fingerprint is not a good representation of the actual user fingerprint, there will likely be no match in the database and access will be denied. Thus, each individual should have been previously registered with the computer 100.

Figure 2:
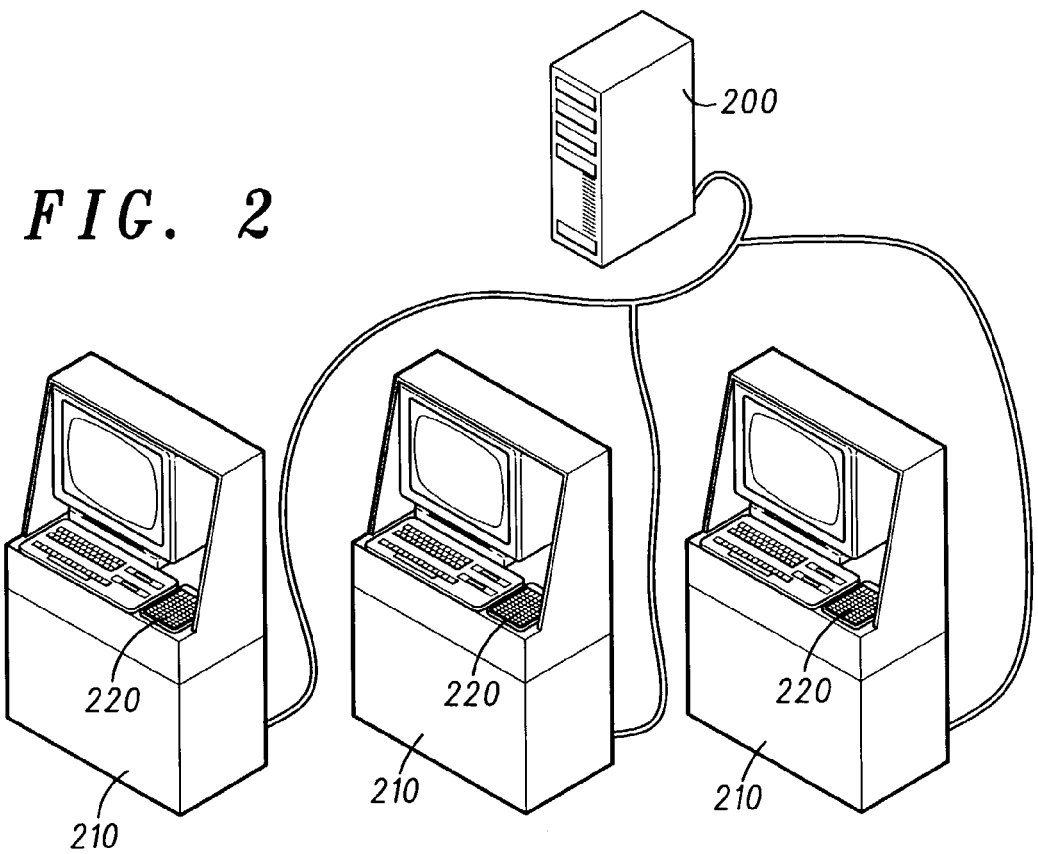
FIG. 2 is a block diagram of an automated teller machine network, representing an embodiment of the invention.

Referring to FIG. 2, a block diagram of an automated teller machine (ATM) network is depicted. A central processing computer 200 is coupled to a set of ATMs 210 via a network. Each ATM 210 includes a DFR 220, and each DFR 220 may have different optical or scanning characteristics.

Still referring to FIG. 2, in one embodiment, the ATM 210 receives inputs from a user via an input device such as a dial pad. Once the DFR 220 has authorized the user, any command can be entered and processed. In another embodiment, the ATM 210 receives inputs via a touch-screen. The touch-screen can itself include a DFR 220, which may constantly monitor the screen, therefore being operable to authorize every command.

Still referring to FIG. 2, the ATM 210 can be used in conjunction with a magnetic card reader in addition to the DFR 220. In one embodiment, a magnetic card contains information regarding a user bank account such as an account number, while the DFR 220 confirms the user identity by comparing the user digitized fingerprint with a database of fingerprints associated with bank accounts. The bank account/fingerprint database can be stored in the central processing computer 200. In another embodiment, a user fingerprint can, by itself, provide complete access to the user's bank account.

The invention can provide a method of calibration or correction between different DFRs. Such calibration or correction allows users previously registered at a central fingerprint database to be correctly identified by different DFRs with different characteristics at each computer terminal or ATM.

Figure 3:
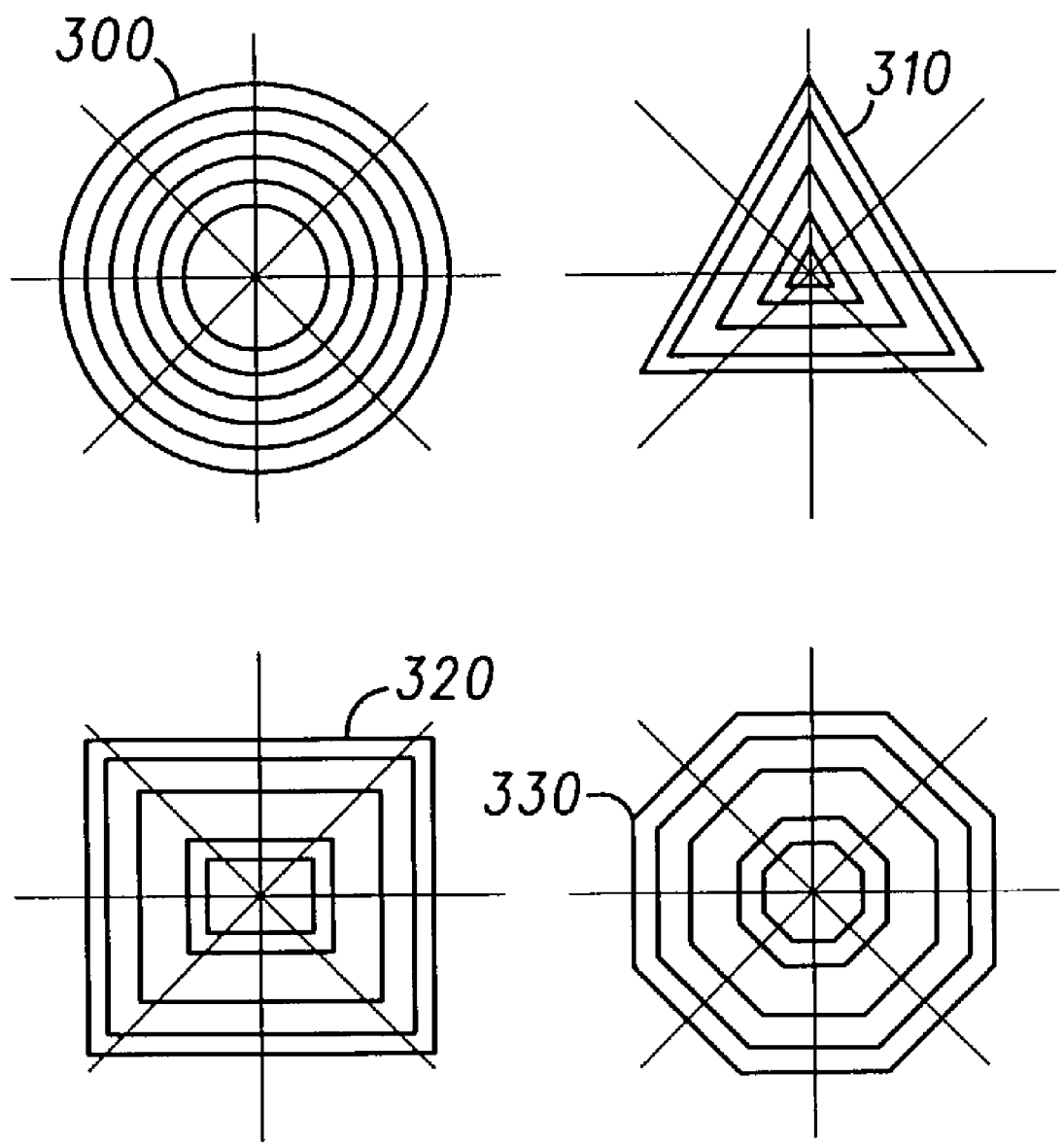
FIG. 3 is a diagram of a set of standard patterns, representing an embodiment of the invention.

Referring to FIG. 3, a diagram of a set of standard patterns is depicted, including: an oval pattern 300, a triangular pattern 310, a square pattern 320 and a hexagonal pattern 330. A standard pattern is composed of concentric figures with cross lines, and can be employed to identify and teach a central processing computer the characteristics of each DFR installed in each computer terminal or ATM in a network. One of ordinary skill in the art will recognize that other standard patterns can be derived from the teachings contained herein.

Once a user's fingerprint is registered with the central processing computer as their identification, their fingerprint can be used at any terminal of the computer system for authentication. In one embodiment, a transformation coefficient is determined according to Table I (set forth below):

TABLE I

| ATM Id's, Branch Offices | Standard Pattern | ATM reading of Standard | Transformation coeff of ATM | How to decide (K)'s | Teach each characteristic coeff to main computer | Main computer reading |
|---|---|---|---|---|---|---|
| $T_1$ | S | $S_1$ | $k_1$ | $S*k_1 = S_1$ | $k_1 = S_1/S$ | $S = (1/k_1)*S_1$ |
| $T_2$ | S | $S_2$ | $k_2$ | $S*k_2 = S_2$ | $k_2 = S_2/S$ | $S = (1/k_2)*S_2$ |

TABLE I-continued

| ATM Id's, Branch Offices | Standard Pattern | ATM reading of Standard | Transformation coeff of ATM | How to decide (K)'s | Teach each characteristic coeff to main computer | Main computer reading |
|---|---|---|---|---|---|---|
| $T_3$ | S | $S_3$ | $k_3$ | $S*k_3 = S_3$ | $k_3 = S_3/S$ | $S = (1/k_3)*S_3$ |
| ... | ... | ... | ... | ... | ... | ... |
| $T_n$ | S | $S_n$ | $k_n$ | $S*k_n = S_n$ | $k_n = S_n/S$ | $S = (1/k_n)*S_n$ |

An ATM's DFR $T_n$ is presented with a standard pattern S, and the reading of such pattern yields a digitized pattern $S_n$. The relationship between the standard pattern S and the digitized pattern $S_n$ is defined by a transformation coefficient $k_n$, wherein $k_n = S_n/S$. Each ATM in the network ($T_1$, $T_2$, ... $T_n$) is associated with a transformation coefficient ($k_1$, $k_2$, ... $k_n$). Each transformation coefficient may be stored in a main computer or central processing computer. The transformation coefficient can be a scaling factor. The transformation coefficients can also be stored locally, at each ATM or computer terminal.

A method for determining a transformation coefficient includes providing a network with a stored pattern, i.e., a digitized electronic copy of a pattern. An external pattern corresponding to the stored pattern is read with a fingerprint reader. The stored pattern can be an identical electronic copy of the external pattern. By comparing the read pattern with the stored pattern, a characteristic (transformation coefficient) of the fingerprint reader is determined.

Upon determination of all transformation coefficients in a network, each ATM's DFR is characterized. Fingerprint readings provided by any particular ATM can be adjusted or calibrated to provide a digitized fingerprint compatible with those of other ATMs. That is, once a transformation coefficient for an ATM is determined and stored, any user registered with the main computer can use such ATM. An ATM fingerprint reading can be authenticated by a main computer according to Table II (set forth below):

TABLE II

| ATM | Reading of user fingerprint | Main computer verification |
|---|---|---|
| $T_1$ | $f_1$ | $F_1 = (1/k_1)*f_1$ |
| $T_2$ | $f_2$ | $F_2 = (1/k_2)*f_2$ |
| $T_3$ | $f_3$ | $F_3 = (1/k_3)*f_3$ |
| ... | ... | ... |
| $T_n$ | $f_n$ | $F_n = (1/k_n)*f_n$ |

Referring to Table II, a user's fingerprint applied to an ATM's DFR $T_n$ results in a digitized fingerprint image $f_n$. The digitized fingerprint fn is adjusted by a $1/k_n$ coefficient, wherein $k_n$ is a transformation coefficient obtained during calibration of $T_n$ with a standard pattern (see Table I). The adjusted fingerprint $F_n$ is used to scan the main fingerprint database for a match.

In another embodiment, the invention provides a method for determining an image transfer function for each DFR. A fingerprint reader $T_n$ is presented with a standard pattern $S(x,y)$. A read pattern $S_n(x,y)$ can be modeled as the two-dimensional convolution of the standard pattern $S(x,y)$ and a DFR transfer function $k_n(x,y)$:

$$Sn(x,y) = S(x,y) \otimes kn(x,y)$$

Numerous methods for solving the above equation are known to one of ordinary skill in the art, including several numerical methods such as: inverse filtering, Wiener filtering, and least squares filtering. The DFR transfer function $kn(x,y)$ can be stored in a database and utilized to authenticate a user fingerprint $F(x,y)$ according to:

$$Fn(x,y) = F(x,y) \otimes kn(x,y)$$

wherein $Fn(x,y)$ is a transformed (calibrated) fingerprint image resulting from the convolution of the user fingerprint $F(x,y)$ with the transfer function $kn(x,y)$.

Upon determination of all transfer functions in a network, each ATM's DFR is characterized. Fingerprint readings provided by any particular ATM can be adjusted or calibrated according to the DFR transfer function to provide a digitized fingerprint compatible with readings of others.

Aspects of the invention can be implemented via software or hardware, as will be understood by those of ordinary skill in the art. The invention can include an algorithm for calibrating biometric computer systems. The invention can also include a biometric system for replacing password/PIN terminals.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term software or computer program, as used herein, is defined as a sequence of machine-readable instructions on a media designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

All the disclosed embodiments of the invention disclosed herein can be made and used without undue experimentation in light of the disclosure. The invention is not limited by theoretical statements recited herein. Although the best mode of carrying out the invention contemplated by the inventors is disclosed, practice of the invention is not limited thereto. Accordingly, it will be appreciated by those skilled in the art that the invention may be practiced otherwise than as specifically described herein.

Further, variation may be made in the steps or in the sequence of steps composing methods described herein.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method for adjusting a digitized fingerprint of a user, comprising:

providing a computer network with a terminal;

providing the terminal with a fingerprint reader;

reading using the fingerprint reader a standard pattern selected from a group consisting of an oval pattern, a triangular pattern, a square pattern, and a hexagonal pattern to generate a read pattern for the fingerprint reader;

generating a transformation coefficient for the fingerprint reader by comparing a digital electronic copy of the selected standard pattern with the read pattern;

storing the transformation coefficient at the terminal or a central computer connected to the computer network; and adjusting the digitized fingerprint of the user by using the transformation coefficient to generate an adjusted fingerprint of the user.

2. The method of claim 1, wherein adjusting the digitized fingerprint comprises adjusting the digitized fingerprint by a scaling factor corresponding to the stored transformation coefficient.

3. The method of claim 1 further comprising using the adjusted fingerprint to scan a central fingerprint database connected to the computer network.

4. The method of claim 1, wherein providing the computer network with the terminal includes providing the computer network with an automated teller machine.

5. The method of claim 1, wherein the transformation coefficient is a ratio of the read pattern and the selected standard pattern.

6. The method of claim 3 further comprising granting access to a bank account corresponding to the user if there is a match between the adjusted fingerprint and a database of stored fingerprints based on a comparison between the adjusted fingerprint and the database of stored fingerprints.

7. The method of claim 6, wherein granting access to the bank account further comprises using a magnetic card reader in conjunction with the fingerprint reader.

8. The method of claim 6, wherein the magnetic card reader contains information regarding a bank account number associated with the user.

9. The method of claim 8, wherein the transformation coefficient is stored at a central computer associated with the computer network.

10. The method of claim 8, wherein the transformation coefficient is stored at the terminal.

11. The method of claim 1 further comprising registering the adjusted fingerprint with a database of stored fingerprints.

12. The method of claim 1, wherein the transformation coefficient relates to at least one characteristic of the fingerprint reader.

13. The method of claim 1 further comprising obtaining a fingerprint of the user via a touch-screen.

* * * * *